United States Patent [19]

Dai et al.

[11] Patent Number: 5,671,541
[45] Date of Patent: Sep. 30, 1997

[54] ACCURACY VERIFICATION DEVICES FOR COORDINATE MEASURING MACHINES

[75] Inventors: YuZhong Dai, Coventry; Thomas Charlton, Jr., North Kingston, both of R.I.

[73] Assignee: Brown & Sharpe Manufacturing Company, North Kingstown, R.I.

[21] Appl. No.: 523,048

[22] Filed: Sep. 1, 1995

[51] Int. Cl.$^6$ .................................................. G01B 3/30
[52] U.S. Cl. ................................ 33/502; 33/567; 73/1 J
[58] Field of Search ........................ 33/502, 567, 567.1, 33/553; 73/1 J

[56] References Cited

U.S. PATENT DOCUMENTS

| | | | |
|---|---|---|---|
| 2,712,695 | 7/1955 | Aller | 33/567 |
| 3,908,278 | 9/1975 | Sundahl | 33/502 |
| 4,373,267 | 2/1983 | Lycan | 33/502 |
| 4,429,464 | 2/1984 | Burrus | 33/502 |
| 4,445,276 | 5/1984 | Voneky et al. | 33/567 |
| 4,777,818 | 10/1988 | McMurtry | 73/1 J |
| 4,982,504 | 1/1991 | Soderberg et al. | 33/502 |
| 5,109,609 | 5/1992 | Anderson | 33/502 |
| 5,189,806 | 3/1993 | McMurtry et al. | 33/553 |
| 5,329,703 | 7/1994 | Craig | 33/502 |
| 5,533,271 | 7/1996 | Callaghan, Jr. | 33/502 |

Primary Examiner—Christopher W. Fulton
Attorney, Agent, or Firm—Wolf, Greenfield & Sacks, P.C.

[57] ABSTRACT

Devices for verifying the dimensional accuracy of a measuring instrument are provided. In one embodiment, a verification block has a substantially planar surface and a known nonplanar surface adjacent thereto. During verification, a probe attached to the CMM moves along the nonplanar surface while simultaneously contacting the planar surface and measures the features of the nonplanar surface. Any difference between the measured features and the known features of the nonplanar surface is an indication of inaccuracies in the CMM. Other embodiments of the invention include structures which compare CMM measured readings with known readings by an encoder as it moves along a linear scale. In another embodiment, the measured readings are compared to readings provided by opto-electric switches. In still another embodiment, a cam is rotatably mounted to the end of the probe of the CMM and moves the probe along the z axis as the cam moves along a surface. A predicted period based on the known cam geometry is compared to the period of motion measured by the CMM. Any difference between the measured period and the actual period is an indication of inaccuracies in the CMM.

23 Claims, 6 Drawing Sheets

ACCURACY VERIFICATION DEVICES FOR COORDINATE MEASURING MACHINES

FIELD OF THE INVENTION

This invention relates to dimensional accuracy verification devices. More specifically, this invention relates to accuracy verification devices which are used to verify the dimensional accuracy of coordinate measuring machines.

BACKGROUND OF THE INVENTION

A coordinate measuring machine (CMM) provides a highly precise dimensional analysis of a workpiece, such as a manufactured item from a machine shop or a production facility. The CMM may have three sets of guideways which establish probe motion in a measurement volume. Generally, a probe on the CMM moves in three dimensions and contacts various desired measurement locations on the workpiece. The coordinates of the probe are measured by scales, which are disposed along each direction of movement. Personnel in the measuring and testing field use CMMs to assure the tight manufacturing tolerances which are required in modern fabrication and assembly facilities.

One available type of probe is a hard probe, which includes a metallic sphere at its tip. The hard probe relies on the contact between the probe and the workpiece to register the location of a measurement point. Another type of probe is a touch trigger probe (TTP) which transmits an electrical signal when the probe makes even slight contact with the workpiece. The TTP typically requires much less contact force with the workpiece than a hard probe to register the location of a measurement on the workpiece. Each type of probe is commonly used with a CMM.

A CMM must be calibrated prior to use so that it can accurately measure the coordinates of locations on the workpiece. It is not uncommon to require a CMM to be accurate within a few micrometers. Even though the CMM's are manufactured to exacting tolerances, errors in the machine arise because of scale errors, slight deformations of the guideways, and the like. Each source of error must be accounted for so that the CMM will provide accurate measurements. The CMM has six error components for each direction of movement. There are three linear errors, Dx, Dy and Dz and three rotational errors, Ax, Ay and Az. These six error parameters can be measured at a number of points along each coordinate direction of the machine, resulting in an error matrix of 18 error parameters. From the matrix of 18 error parameters, the "parametric" error at any point in the measurement volume can be calculated and stored in the CMM. When a CMM measures a workpiece, the parametric error is used to correct every CMM measurement. Thus, the machine accurately measures the workpiece.

Various techniques have been used for the measurement of parametric errors to calibrate the CMM. One such apparatus for calibrating a CMM is disclosed in U.S. Pat. No. 4,884,889, issued to Beckwith, Jr. The Beckwith, Jr. patent discloses a calibration apparatus which includes a reflector assembly and a laser measuring assembly. The reflector assembly is attachable to a ram on the CMM. The laser measuring assembly is attached to a mounting fixture which is placed on a CMM measuring table during calibration. The laser measuring assembly directs a laser beam at the reflector assembly, senses the laser beam as it is reflected from the reflector assembly and generates displacement, straightness, pitch, yaw and roll error signals. The signals are then converted into a matrix of parametric errors for each point in the CMM measuring volume. Once the parametric errors have been determined and stored in the CMM, the device has been calibrated. The parametric errors are used during an actual measurement to correct scale readings.

Even after the CMM has been calibrated, the accuracy of the CMM must be independently and/or periodically verified. CMM accuracy may degrade gradually as a result of aging, temperature variations and the like, or abruptly as a result of improper treatment. Various accuracy verification devices have been used to verify the accuracy of coordinate measurement machines. In general terms, the accuracy of a CMM is verified by measuring a device having a precisely known dimension or a constant dimension. When the device has a known dimension, the measured dimension is compared with the known dimension. Because the dimensions of the accuracy verification device are precisely known, any discrepancy between the known dimension and the measured dimension is the result of inaccuracies in the CMM or its use. Such inaccuracies may be corrected by recalibrating the coordinate measuring machine. When the measured dimension is within acceptable limits of the known dimension, the accuracy of the CMM has been verified. When the device has a constant but not precisely known dimension, successive measured dimensions at different locations in the working volume of the machine may be compared to evaluate the accuracy of the machine.

The prior art includes two types of devices which are used in mechanical tests to verify the accuracy of a CMM. A first type of accuracy verification device is a "ball bar", which is an elongate bar having a sphere rigidly attached to each end. The distance between the spheres is a constant. A probe, which is attached to the CMM, is brought into contact with each of the balls of the ball bar, and the coordinates of the balls are measured. The CMM then provides a measurement of the distance between the two spheres. The accuracy of the CMM is verified by comparing the measured distance to the known dimension. If the difference between the measured distance and the known distance is outside acceptable limits, the CMM can be recalibrated and retested. This process is repeated at a multiple of locations within the CMM volume until the measured reading is within the acceptable limits and the accuracy of the CMM is verified.

A second prior art device used to verify the accuracy of a CMM is a step gauge, which comprises parallel surfaces or steps having a known distance therebetween. When the step gauge is used to verify the accuracy of a CMM, the probe measures the distance between the surfaces. The measured distance is compared to the known distance and, when differences between the distances are within acceptable limits, the accuracy of the CMM has been verified.

When the accuracy of a CMM having a hard probe is verified using a ball bar, inaccuracies are introduced into the verification process because the bar deflects slightly as the hard probe contacts each of the balls. When a step gauge is used, the hard probe may also deflect the step gauge and introduce error into the verification process. Even slight deflections during the verification procedure can cause significant errors when the desired level of accuracy is in microns. Additionally, when using a step gauge, the measured distance between the parallel surfaces does not always accurately represent the true distance between parallel surfaces. Inaccuracies are introduced because the known or true distance is defined by a line normal to the parallel surfaces. However, when the probe is used to determine the distance between the surfaces, it is unlikely that the distance along the normal line is measured. More likely, the measured distance is slightly longer than the true distance because the measurement is not taken along a normal line between the surfaces. Because of possible deflections in the devices, and the problems of measuring the line normal to the parallel surfaces when using a step gauge, the prior art accuracy verification devices may not provide the desired level of accuracy verification. Moreover, the step gauges available in the prior art are expensive, costing several thousand dollars each.

Accordingly, it is an object of the present invention to provide precision accuracy verification devices which are easy to use and relatively inexpensive to produce.

SUMMARY OF THE INVENTION

According to one embodiment of the invention, a device for verifying the accuracy of a machine including a fixed element, a movable element and measuring devices for measuring the position of the movable element relative to the fixed element is provided. The device comprises a verification block which is adapted to be mounted in fixed position relative to the fixed element of the machine. The block has a surface with a predetermined nonplanar contour along a direction of elongation. The contour has known geometric characteristics. The movable element of the machine movable along the nonplanar contour in the direction of elongation in contact with the surface for verifying the accuracy of the measuring machine. The accuracy of the machine is verified by comparing the known geometric characteristics of the block with values derived from readings of the measuring devices of the machine.

In one preferred aspect of this embodiment, the surface having a predetermined nonplanar contour comprises a first surface, and the block has a second surface having a substantially planar contour along the direction of elongation. The first and second surfaces define a recess in the verification block. The movable element comprises a probe that is positioned in the recess in simultaneous contact with the first and second surfaces and is moved along the first and second surfaces in the direction of elongation for verifying the accuracy of the machine.

The first surface may vary smoothly along the direction of elongation or may include segments that intersect along lines of intersection. In one preferred embodiment, the contour of the first surface comprises two or more circular arcs. Each circular arc disposed along the direction of elongation may have a different radius. Alternatively, the dimensions of the circular arcs along the direction of elongation may vary.

A method for verifying the accuracy of a measuring machine including a fixed element, a probe, measuring devices for measuring the position of the probe relative to the fixed element, and a processor is provided. The method comprises the steps of positioning a block having a surface with a predetermined nonplanar contour along the direction of elongation with respect to the fixed element. The nonplanar contour has predetermined characteristics. The probe is guided along the direction of elongation while contacting the surface and the measured coordinates representing the movement of the probe are measured by the measuring devices. The measured coordinates are processed in the processor to yield measured characteristics of the contour. The measured characteristics of the contour are then compared with the predetermined characteristics of the surface to determine the accuracy of the measuring machine.

When using one preferred embodiment of the accuracy verification block to verify the accuracy of a CMM, the block is mounted on a table of the CMM. The probe is moved along the direction of elongation of the verification block and simultaneously contacts the planar surface and the contoured surface. The CMM computes the characteristics of the contoured surface based on the measured coordinates of the contoured surface. The measured characteristics of the contoured surface are then compared to the known characteristics of the contoured surface, such as the distance between centers of circular arcs, the period or radius of curvature. Any difference between the measured characteristics and the known characteristics represents inaccuracies in the CMM.

According to another embodiment of the invention, an accuracy verification device comprising a block adapted to be mounted in a fixed position relative to the fixed element of the machine the block has a linear scale mounted along a direction of elongation. The device further comprises a support member for attachment to the movable element of the measuring machine and adapted for movement along the direction of elongation of the block with the movable element, and an encoder disposed on the support member at a position proximate the linear scale for reading the distance traveled along the linear scale when the support member moves with respect to the block a difference between a reading of the encoder and a value derived from readings of the measuring devices of the machine is indicative of the accuracy of the machine.

In a further embodiment of the invention, the probe is disposed within a recess in a carriage which is movable along an elongate bar. An encoder is mounted on the carriage and reads a scale that is mounted on an adjacent surface of the elongate bar. During an accuracy verification procedure, the carriage moves along the bar, and the distance read by the encoder is compared to the distance measured by the measuring devices of the machine.

In yet another embodiment of the invention, an accuracy verification device comprises a block for mounting in a fixed position relative to the fixed element of the machine, the block has a guideway with at least two side surfaces formed in a surface of the block. The device further comprises a plurality of switches disposed on the block along the guideway and known distances and adapted to signal the machine when the movable element moves along the guideway. The known distance between the switches is compared to a distance, derived from readings of the measuring devices of the machine, that the movable element has moved between the switches to determine the accuracy of the machine.

According to additional embodiments of the invention, an accuracy verification device for verifying the accuracy of a measuring machine including a fixed element, a movable element having an axis and a probe coupled to the movable element is provided. The accuracy verification device comprises means for reciprocating the movable element along the axis as the probe travels along a surface while the probe is in contact with the surface and a read head disposed on the machine for measuring the period of reciprocation of the movable element. The measured period is compared to a period based on the characteristics of the means for reciprocating to provide an indication of the accuracy of the machine. In one embodiment a cam is rotatably mounted on a horizontal axis at the end of the probe. The cam has precisely known surface characteristics. As the probe moves along a horizontal direction, the cam rotates about the axis while contacting a surface and the movable element moves in a vertical direction by the rotation of the cam. In another embodiment, an actuator is coupled between the movable element and the probe. The actuator moves vertically as the probe moves in the horizontal direction while maintaining contact with the surface. The actuator causes the movable element to move vertically and provides the same type of periodic data as the cam.

In still another embodiment of the present invention, an accuracy verification block having a direction of elongation is provided with channels which extend transverse the direction of elongation. The precisely known features of the block, such as the distances between the channels, are used to verify the accuracy of the machine. Any difference between known distance and the measured distance indicates inaccuracies in the machine.

Each of the embodiments of the invention provides a simple and relatively inexpensive device for verifying the accuracy of a CMM or other measuring machine. Additionally, each of the embodiments disclosed may be used to calibrate a CMM. Each embodiment of the invention can be used to verify the accuracy of a CMM having any type of probe, such as a hard probe or a TTP probe or an analogue probe. These and other features of the present invention will be better understood and appreciated from the following detailed description of the several embodiments thereof, selected for the purposes of illustration and shown in the accompanying drawings.

DETAILED DESCRIPTION

The present invention will be more completely understood through the following detailed description which should be read in conjunction with the attached drawings in which similar reference numbers indicate similar structures.

Figure 1:
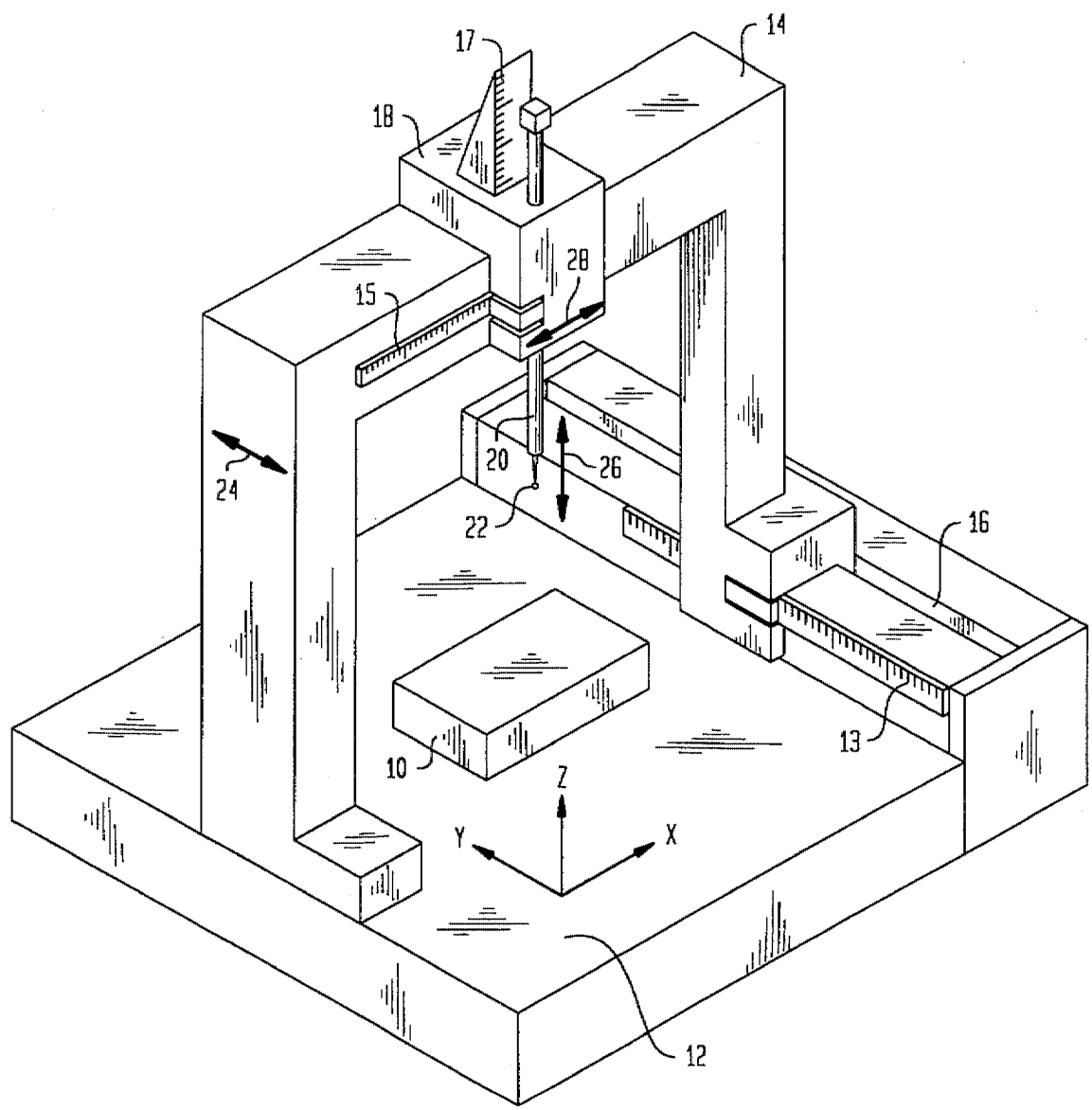
FIG. 1 is a perspective view of a prior art coordinate measurement machine.

A prior art moving bridge coordinate measuring machine is shown schematically in FIG. 1. The machine is capable of measuring dimensions of a workpiece 10, which is mounted on a fixed machine table 12. The x, y, and z axes of the machine are illustrated. A bridge 14 moves in a y direction, as indicated by arrow 24, along guideway 16 on table 12. A carriage 18 moves along the x direction, as indicated by arrow 28, along guideways on the bridge 14. A ram 20 with a probe 22 mounted on its lower end moves vertically through bearings in the carriage 18 along the z direction, as indicated by arrow 26. A scale 13 (between the bridge 14 and the table 12), a scale 15 (between the carriage 18 and the bridge 14), and a scale 17 (between the ram 20 and the carriage 18) each cooperate with a read-head (or encoder) to indicate the positions of the movable elements in the three axial directions. To measure the coordinates of a measurement point on the workpiece 10, the probe 22 is brought into contact with the measurement point. In a manual CMM, an operator initiates a measurement by the CMM. In an automatic CMM, the probe senses contact and causes a system computer to store the readings of the three scale systems. One example of an automated moving bridge coordinate measuring machine is model 7101-2418 manufactured by Brown and Sharpe Manufacturing Company. A MicroVal machine is an example of a manual CMM available from Brown and Sharpe. Each embodiment of the accuracy verification system of the present invention can be used with any CMM machine and with other machines having fixed and movable elements.

Figure 2A:
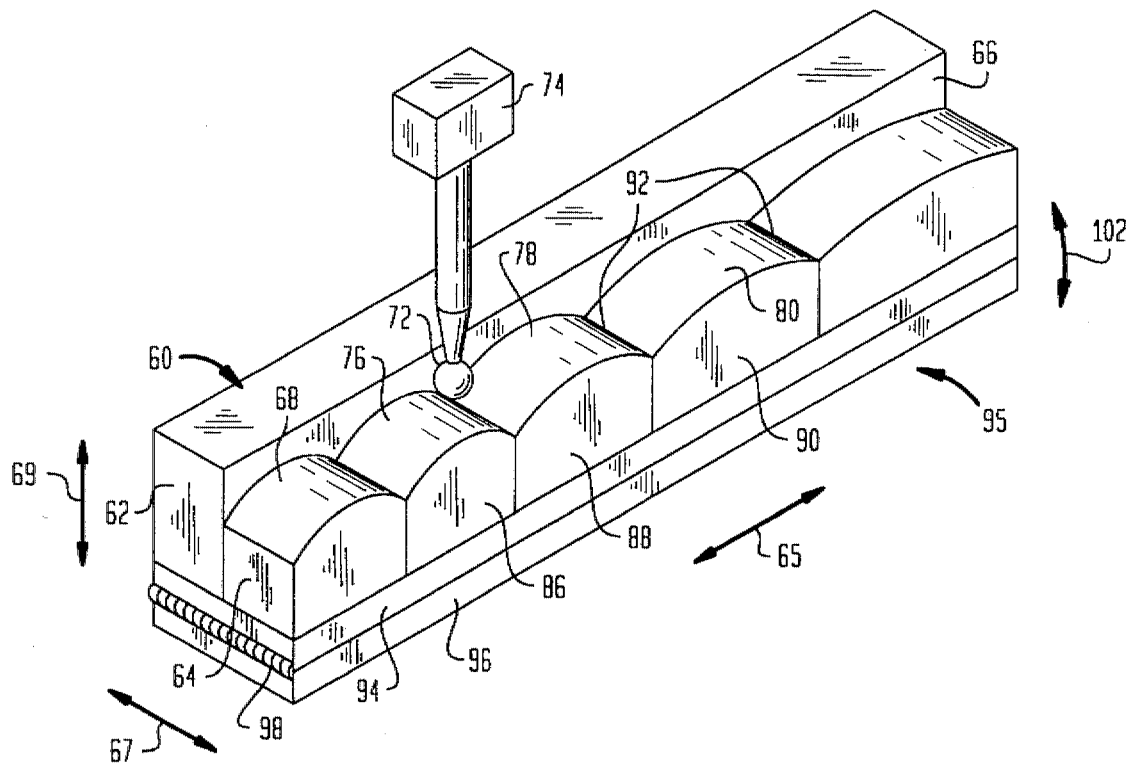
FIGS. 2A and 2B are perspective views of verification blocks in accordance with first and second embodiments of the invention, respectively.
Figure 2B:
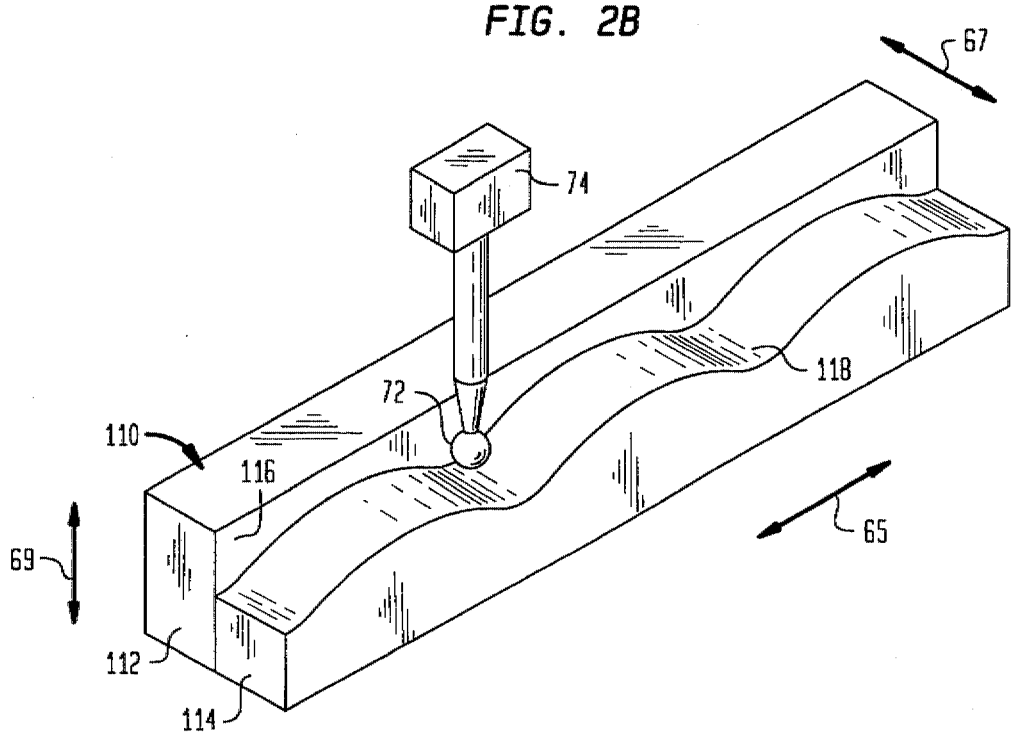

First and second embodiments of an accuracy verification device in accordance with the present invention are shown in FIGS. 2A and 2B. A verification block 60 shown in FIG. 2A includes a surface 66 and a surface 68, which intersects surface 66. The block 60 is elongated in a direction 65. The surface 66 has a substantially planar contour and lies in a plane that is parallel to direction 65 and to a direction 69. The surface 68 has a predetermined nonplanar contour and is generally parallel to direction 65 and to a direction 67. The directions 65, 67 and 69 are mutually orthogonal. The surfaces 66 and 68 define a recess, or channel, in block 60. During an accuracy verification procedure, a probe 72 of a CMM is moved along the block 60 in direction 65, with the probe 72 in simultaneous contact with surfaces 66 and 68. It should be understood that surface 66 is optional.

Figure 2C:
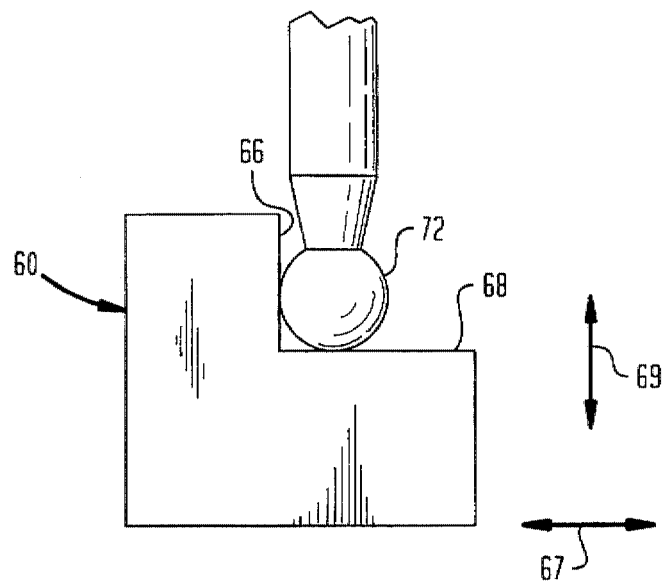
FIG. 2C is a cross section of the verification block shown in FIG. 2A, perpendicular to the direction of elongation.

A cross section of the block 60 in a plane perpendicular to direction 65 is shown in FIG. 2C. The surfaces 66 and 68 typically intersect at right angles, thus defining an L-shaped recess However, other angles of intersection, including an angle that varies along direction 65, are included within the scope of the present invention. As shown in FIG. 2C, a line in surface 68 perpendicular to direction 65 is preferably, although not necessarily, a straight line. Probe 72 moves along direction 65 in the L-shaped recess in simultaneous contact with surfaces 66 and 68.

The surface 68 varies in elevation and preferably has o or more elevation variations, or cycles, along direction 65, as shown in FIG. 2A. The "elevation" of surface 68 refers to its coordinate along direction 69. The elevation cycles of surface 68 along direction 65 may have a constant or variable period and a constant or variable amplitude. In addition, the surface 68 may vary in elevation smoothly (FIG. 2B) or abruptly (FIG. 2A) along direction 65.

The verification block 60 may be fabricated as a single piece having surfaces 66 and 68. Alternatively, the block 60 may be fabricated as a first portion 62 having surface 66 and a second portion 64 having surface 68. The first and second portions are securely fastened together. The verification block 60 is preferably fabricated of a stable metal such as steel and may, for example, be approximately 12 inches long. The nonplanar surface 68 is a precision surface, whereas the planar surface 66 is not required to be a precision surface. The surfaces 66 and 68 have sufficient width to permit probe 72 to contact both of these surfaces simultaneously as it moves along direction 65.

As shown in FIG. 2A, the surface 68 may comprise two or more surface segments which intersect along lines 92.

The segments may comprise convex humps 76, 78, 80. etc. as shown in FIG. 2A. Each hump may comprise an arc of a circle, thus having a constant radius of curvature. The humps 76, 78 and 80 have centers 86, 88 and 90, respectively. Alternatively, the humps may have a variable radius of curvature. Different humps may have different radii of curvature. The spacing between lines 92, and thus the dimensions of the surface segments along direction 65, may be constant or variable. In another embodiment, the segments may comprise two or more concave, curved recesses. In still another embodiment, the segments may comprise two or more linear ramps that alternate between positive and negative slopes.

A verification block 110 shown in FIG. 2B includes a substantially planar surface 116 and a surface 118 having a predetermined nonplanar contour. The surface 118 contains two or more elevation cycles and varies smoothly without lines of intersection between surface segments. As in the embodiment of FIG. 2A, the elevation cycles may have a constant or variable radius of curvature, a constant or variable period along direction 65 and a constant or variable elevation amplitude. In general, the nonplanar contours of surfaces 68, 118 are selected to provide a set of precisely known data points, or coordinates, that are compared with the coordinates measured by the CMM as the probe is moved along the surface.

The accuracy verification blocks shown in FIGS. 2A and 2B are adapted to be oriented along of the x, y or z axes of the CMM. With reference to FIG. 2A, a pivoting platform assembly 95 supports the block and enables the block to be oriented so that the direction of elongation extends in the Z-direction of the CMM. A rectangular support member 94 is rigidly mounted on the bottom surface of the block 60. A base 96 is pivotally mounted to the support member 94 by a hinge 98 and is adapted to pivot on the hinge 98 as indicated at arrow 102.

The surface contours of the verification block according to the invention are precisely determined. If a surface contour with circular arcs is used, the surface of the circular arc can be used to determine the center of each arc. If a surface with a regular period is used, the period can be precisely determined. Each surface contour which is used, and the data which is determined therefrom forms a "data profile" of the accuracy verification block. The data profile of the block is entered and stored in the memory of the CMM. This provides the "known" data from which the accuracy of the CMM can be verified.

In a preferred embodiment, the contour of surface 68 is a plurality of circular arcs. A representative procedure for verifying the accuracy of a CMM is described with reference to FIG. 2A. The verification block 60 is placed on the table of a CMM. The block is preferably fixed to the table so that the block does not move during calibration. The block may be aligned with one of the x, y or z axes in compliance with most accuracy verification standards. However, if desired, the block may be diagonally oriented on the table. During an accuracy verification procedure, the probe 72 is guided along the block in the direction of elongation 65, making simultaneous contact with the planar surface 66 and the contoured surface 68, and the CMM measures the coordinates of the probe as it moves along the direction of elongation. Friction between the probe and each surface should be minimized. The measured coordinates are used to calculate features of the contour, in this example, the center of each circular arc. When the features calculated from measured coordinates are within an acceptable range when compared to the features known from the data profile, the accuracy of the CMM is verified.

When the measured coordinates are not within the acceptable range of the data profile, recalibration of the CMM may be required. Then, the block 60 can be used again to verify the accuracy of the CMM.

When the surface has a parameter that varies with displacement along the direction of elongation, such as the radius of each hump or the spacing between the centers of humps, measurement of that parameter can be used to determine the position of the probe along the verification block. The measured coordinates of the probe as it moves along the block are used to calculate the parameter. The calculated parameter is compared with the known parameters of the block. A match between the calculated parameter and the known parameters, which vary along the length of the block, indicates the position of the probe on the block.

One of the advantages of using a block having circular arcs is that the accuracy verification procedure only requires three measurement points along any one circular arc (three points define a circle) to yield an indication of the CMM accuracy. Of course, more measurement points provide more precise verification of the accuracy of the CMM.

Figure 3:
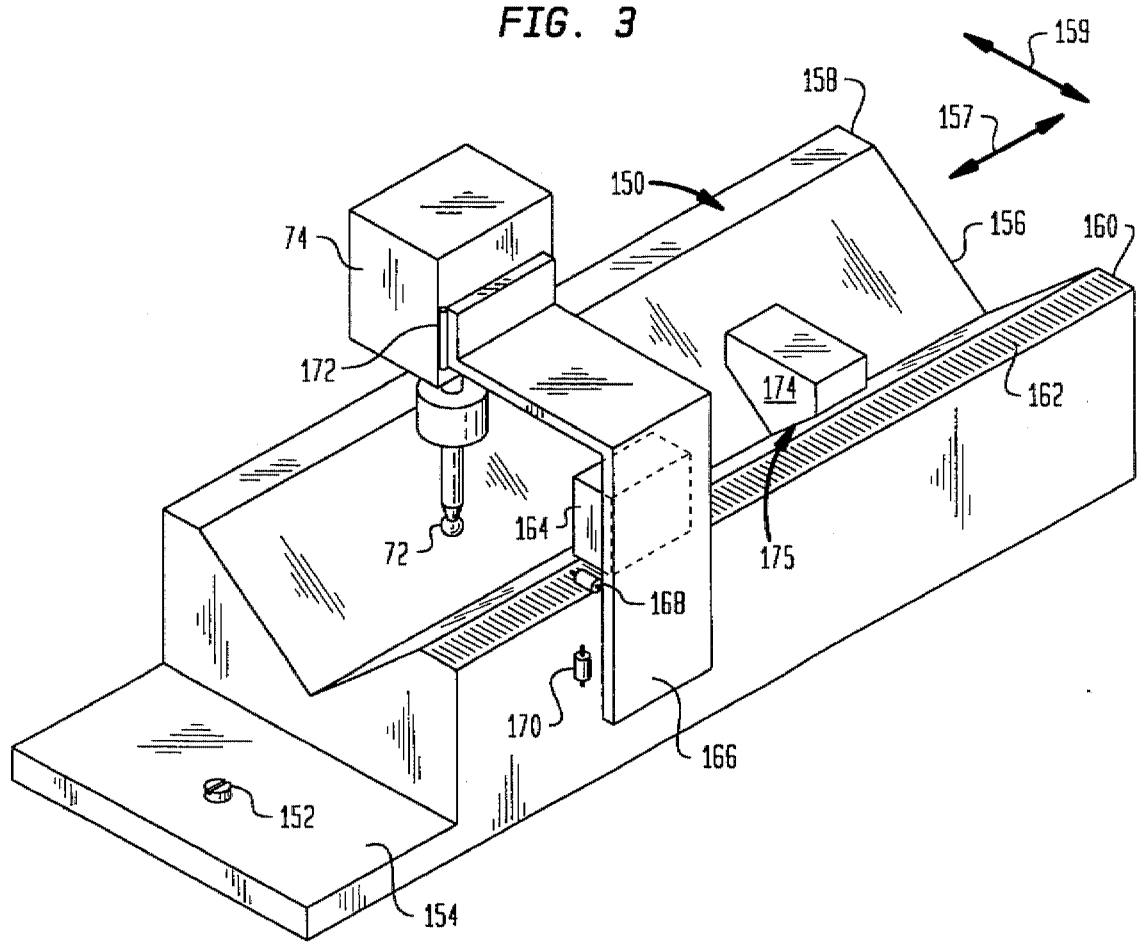
FIG. 3 is a perspective view of a CMM accuracy verification device according to a third embodiment of the invention.

FIG. 3 shows a perspective view of an accuracy verification device according to a third embodiment of the invention. The device includes an elongated verification block 150 which can be removably secured to the CMM table 12 by a fastener, shown in FIG. 3 as a screw 152. The block is generally rectangular in shape and has on its upwardly facing surface a recessed V-shaped channel 156 which is aligned with a direction of elongation 157. Shoulders 158, 160 are disposed on the upper surface of the block, one on each side of the channel 156 along the direction of elongation. A linear scale 162 is located on shoulder 160.

The linear scale 162 is read by an encoder 164 which is mounted on an L-shaped bracket 166. Aligning means including rollers 168 and 170 are provided on the bracket adjacent to the block. Roller 168 maintains the bracket aligned with the block in the vertical direction, and roller 170 maintains the bracket aligned with the block in the transverse direction 159. The bracket is wide enough to maintain a precise alignment with the block 150. The other end of the L-shaped bracket is pivotally mounted to the z-ram 74 of the CMM by a vertically oriented pin 172.

When the verification block 150 is used to calibrate a CMM, the bracket 166 is mounted on the z-ram and is aligned with the verification block 150 such that the encoder 164 is positioned above the linear scale 162. The z-ram is caused to move along the direction of channel 156 in the verification block 150. Simultaneously, the encoder 164 reads the distance traveled along the linear scale 162. The distance measured by the CMM is then compared to the distance read by the encoder 164. Any difference between the two distances is an indication of inaccuracies in the CMM. If the difference between the distance measured by the encoder and the distance measured by the CMM is outside acceptable limits, the CMM can be recalibrated and subsequently retested. When the readings are within the acceptable limits, the accuracy of the CMM is verified.

When the probe 72 is a hard probe, a movable block 174 with a V-shaped bottom surface 175 is placed in the V-shaped channel 156. The probe 72 is moved from a first location to a second location in which the probe contacts the movable block 174, thus simulating a part to be measured and any deflection which would occur during a measurement procedure.

Figure 4:
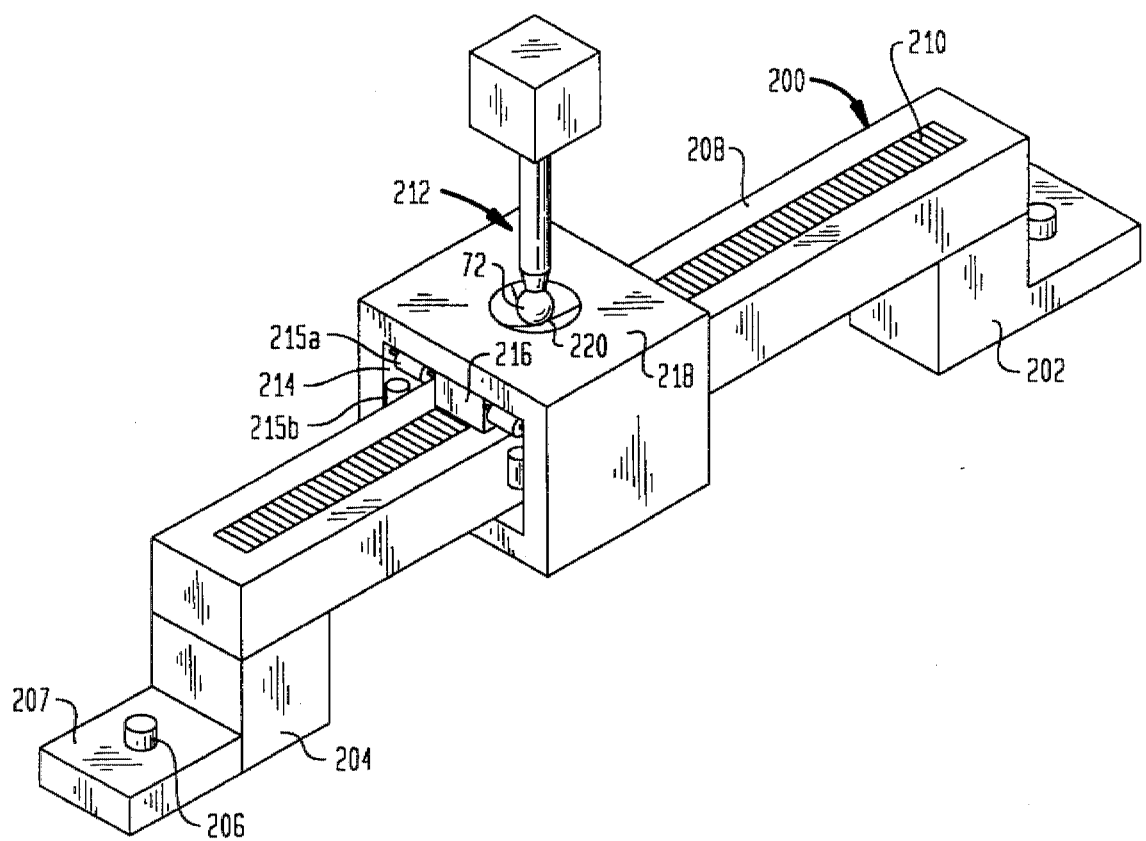
FIG. 4 is a perspective view of an accuracy verification device according to a fourth embodiment of the invention and shows a carriage which is slidable along a guideway.

FIG. 4 shows an accuracy verification device according to a fourth embodiment of the invention. An elongate bar 200 having a rectangular cross section is supported by legs 202 and 204. The legs 202, 204 rest on the table 12 when the device is being used to verify the accuracy of a CMM. The bar can be fastened to the table by a fastener shown as a screw 206 on outwardly facing flanges 207. The bar 200 has an upwardly facing surface 208 on which is mounted a linear scale 210. A carriage 212 is movable along the bar 200. The carriage has an opening therethrough with an inner surface 214 which slidably receives the bar. The carriage is adapted to move along the length of the bar 200. The alignment between the carriage 212 and bar 200 is maintained by rollers 215a, 215b, which provide alignment in the vertical direction, and the lateral direction, respectively. Additionally, and optionally, rollers (not shown) may be provided on the upwardly facing portion of inner surface 214.

An encoder 216 is mounted on the downwardly facing portion of the inner surface 214 and faces the scale 210. The encoder reads the distance traveled by the carriage along the linear scale on the bar 200. The upper surface 218 of the carriage 212 has a recess 220 for receiving the probe 72 of the CMM to be calibrated. The recess 220 is shown as a trihedral recess. The recess 220 provides for secure engagement between the probe 72 and the carriage 212. Alternatively, the recess may be conical. Thus, when the probe 72 is moved, there is no relative motion between the probe and the carriage 212, and any movement of the probe is accurately measured by the encoder. When a device according to the fourth embodiment is used to verify the accuracy of a CMM, the probe 72 is placed within the recess 220 and the probe is moved along the direction of elongation of the bar 200. The CMM measures the distance which the probe 72 moves. Simultaneously, the encoder 216 reads the distance the carriage travels along the linear scale 210, and any difference between the measured distance and the distance read by the encoder is an indication of inaccuracies in the CMM.

Figure 5:
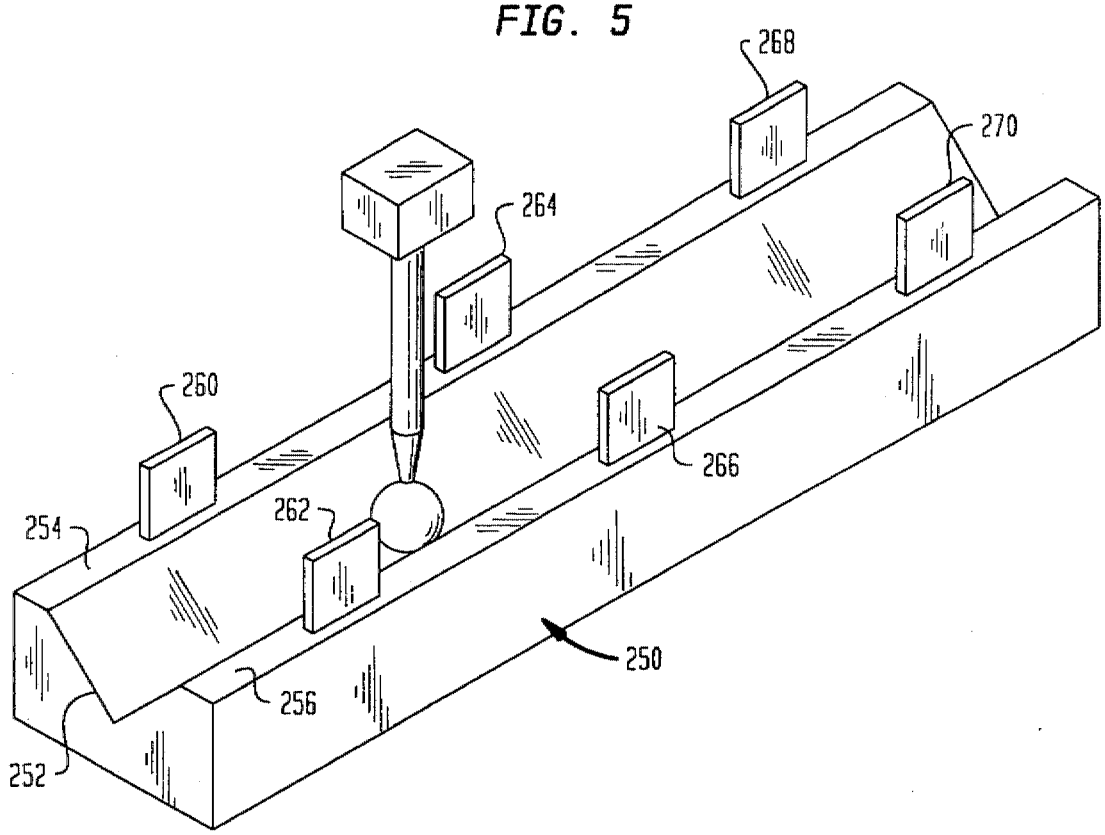
FIG. 5 is a perspective view of an accuracy verification device according to a fifth embodiment of the invention and shows a gauge body having opto-electric switches disposed at known distances along the gauge body.

In a fifth embodiment of the invention, shown in FIG. 5, a generally rectangular verification block 250 has a V-shaped groove 252, or channel, aligned with a direction of elongation. Shoulders 254 and 256 are disposed on the upper surface of the block on opposite sides of the V-shaped groove along the direction of elongation. Opto-electric devices 260, 262; 264, 266; and 268, 270 are disposed on the shoulders 254 and 256 at precisely known locations. Devices 260 and 262 form a first opto-electric switch, devices 264 and 266 form a second opto-electric switch, and devices 268 and 270 form a third opto-electric switch. Each switch comprise a transmitter and a receiver located on opposite sides of groove 252, as shown in FIG. 5. The transmitter sends a light beam to the receiver, and, when the beam is broken, a signal is generated. Alternatively, the transmitter and receiver may be located on the same side of the groove, with a reflector on the opposite side of the groove or a reflector on the probe or a z-ram of the CMM. In each case, the passage of the probe causes a signal to be generated.

In operation, a probe 72 is guided along the V-shaped groove 252 contacting each surface of the groove. As the probe 72 moves along the groove and breaks the beam of a first opto-electric switch, a signal is triggered. As the probe continues to move along the V-shaped groove and breaks the beam of a second opto-electric switch, another signal is triggered. The distance between the switches along the direction of elongation is precisely known, and the known distance is compared to the distance measured by the CMM. Any difference between the two values is an indication of inaccuracies in the CMM. When the difference is outside acceptable limits, the CMM can be recalibrated and subsequently retested to verify the calibration of the CMM.

Figure 6A:
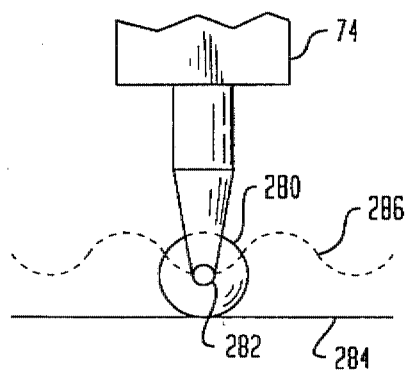
FIGS. 6A and 6B are schematic views of accuracy verification devices according to sixth and seventh embodiments of the invention, respectively, and show a cam disposed on the end of the probe and an actuator on the z-ram, respectively.
Figure 6B:
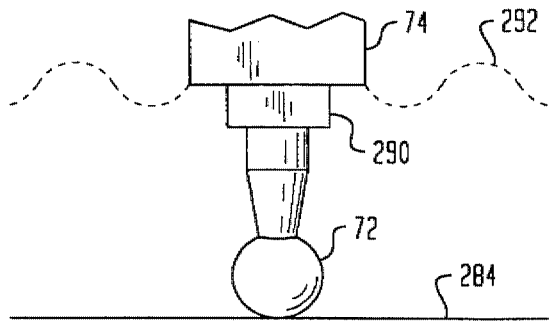

FIGS. 6A and 6B show accuracy verification devices according to sixth and seventh embodiments of the invention, respectively. Referring to FIG. 6A, a cam 280 having a known configuration is rotatably mounted on the tip of the z-ram 74 and rotates on an axis 282. As the z-ram moves along a flat surface 284, the cam 280 rolls along the surface and causes the z-ram to reciprocate in a periodic manner in the z direction, as indicated by path 286. Since the shape and size of the cam 280 are precisely known, the periodic motion of the axis 282 can be precisely predicted as the cam 280 rolls along the surface. Any sliding between the cam 280 and the surface 284 should either be eliminated or factored into the predicted path 286. The predicted periodic path is compared to the measured path as measured and constructed from x, y, z coordinate data points. Any difference between the measured path and the predicted path is an indication of inaccuracies in the machine. When the difference is outside acceptable limits, the CMM can be recalibrated and retested.

FIG. 6B shows the seventh embodiment of the invention in which the periodic motion is caused by an actuator 290 which is disposed between the z-ram and the probe 72. The actuator 290 can be a piezoelectric actuator which causes motion in response to an electronic signal. As the z-ram moves along a flat surface, the probe 72 maintains contact with the surface 284. The actuator causes the z-ram to move up and down in the z direction with a predicted period as indicated by path 292. By way of representative example, the reciprocating motion can be as much as 0.025 inches. The predicted periodic path 292 is compared to the actual path constructed from the values measured by the CMM. Any difference between the predicted values and the measured values indicates inaccuracies in the CMM. When the difference is outside acceptable limits, such inaccuracies can be corrected by recalibrating the CMM and subsequently retesting the machine.

Figure 7:
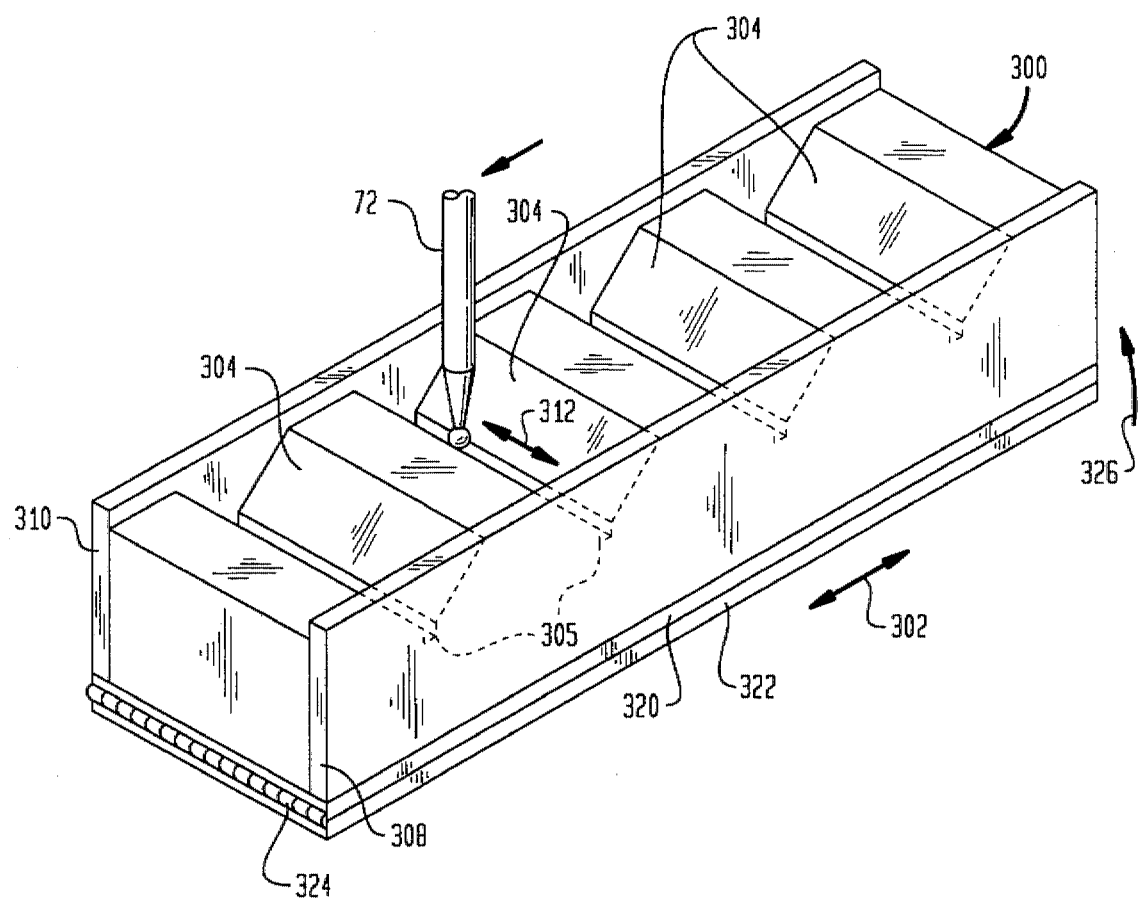
FIG. 7 is a perspective view of an accuracy verification device according to an eighth embodiment of the invention, and shows a block having a plurality of V-shaped channels.

According to an eighth embodiment of the invention, shown in FIG. 7, a block 300 has a direction of elongation, as indicated by arrows 302. The block has a series of V-shaped grooves 304, which, in a preferred form, are transverse to the direction of elongation. Each groove has two substantially flat inclined surfaces which intersect at a line at the bottom of the groove. The grooves may be formed from a single block, such as by cutting, milling or grinding. Alternatively, blocks with beveled edges may be assembled together. In this alternative, a beveled edge of one block cooperates with a beveled edge of an adjacent and adjoining block to form the V-shaped groove. A pair of side walls 308 and 310 may be disposed on opposite sides of the block 300 at the ends of grooves 304.

The lines formed by the intersecting flat surfaces of the V-shaped channels are precisely determined and form the "data profile" which is used to verify the accuracy of the machine. In a preferred form, the lines are substantially parallel. However, non-parallel lines defined by non-parallel grooves may also be used. The characteristics of the line(s) of intersection formed by the grooves are precisely determined and are subsequently entered into the CMM prior to the accuracy verification procedure.

In a preferred form, the block 300 is approximately twelve inches long. Of course, other lengths may be used. The transverse dimension is approximately 1 inch and the block is approximately 1 inch high. The surfaces between the grooves 304 are approximately 0.5 mm in the direction of elongation, and the grooves are approximately 0.5 inches deep. Of course, one skilled in the art will recognize these dimensions are by way of example only. A rectangular channel 305 may be formed at the intersection of the surfaces which define each V-shaped groove. The rectangular channels 305 keep the V-shaped grooves free of foreign material. The block 300 is used to verify the accuracy along each of the x, y and the z axes of the CMM. A platform 320 supports the base of the block. A second platform 322 is pivotally mounted to the platform 320 by a hinge 324. The hinge allows motion between the platforms 320, 322 so that the device can be oriented in a chosen direction. A bracket (not shown) holds the block in the chosen direction. Typically, the platform enables the device to be oriented in the vertical direction.

In operation, the block 300 is disposed on the table 12 in any orientation. Preferably, the block 300 is aligned with an axis of the CMM to verify the accuracy of the machine in accordance with standard procedures. By way of example, when verifying the accuracy in the x direction, the long side of block 300 is placed along the X-axis. A probe 72 is moved along the grooves 304 simultaneously contacting each groove surface and moving in the direction transverse the direction of elongation as indicated by arrow 312. Data points are measured by the CMM as the probe moves along each groove. The measured coordinates obtained from the CMM are used to calculate a "line of best fit" for each of the grooves. The accuracy of the CMM machine is verified by comparing the distance between the line of best fit for each of the grooves of the device and lines created from the data profile for the device. When the line of best fit is the same as the data profile information, the accuracy of the CMM has been verified.

While the devices of the various embodiments of the invention shown and described above have been disclosed as accuracy verification devices, it should be understood that the devices may be used as calibration devices. That is, rather than verifying the accuracy of the machine, the known contoured surface or the encoder readings can be used to calibrate the machine.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A device for verifying the dimensional accuracy of a machine including a fixed element, a movable element and measuring devices for measuring the position of the movable element relative to the fixed element, comprising:

a block adapted to be mounted in a fixed position relative to the fixed element of the machine, said block having a surface with a predetermined nonplanar contour along a direction of elongation, said contour having known geometric characteristics, wherein said block is configured such that the movable element of the machine is movable along said nonplanar contour while in continuous contact with said surface for verifying the accuracy of the machine by comparing said known geometric characteristics of said block with the values derived from readings of the measuring devices of the machine.

2. The device as recited in claim 1, wherein said surface having a predetermined nonplanar contour comprises a first surface, and wherein said block has a second surface, said second surface having a substantially planar contour along said direction of elongation, said first surface and said second surface defining a recess in said block, wherein the movable element comprises a probe that is positioned in said recess in simultaneous contact with said first and second surfaces and movable along said first and second surfaces for verifying the accuracy of the machine.

3. The device as recited in claim 2 wherein said nonplanar contour of said first surface is smoothly curved.

4. The device as recited in claim 3 wherein said smoothly curved contour of said first surface has a predetermined period.

5. The device as recited in claim 2 wherein said nonplanar contour of said first surface includes two or more surface segments that intersect along lines.

6. The device recited in claim 2 wherein said nonplanar contour of said first surface comprises a plurality of substantially circular arcs.

7. The device recited in claim 6 wherein said circular arcs have different radii.

8. The device recited in claim 2 wherein an angle between said first and second surface is substantially constant along the direction of elongation.

9. A method for verifying the accuracy of a measuring machine including a fixed element, a probe, measuring devices for measuring the position of the probe relative to the fixed element, and a processor, comprising the steps of:

(a) positioning a block having a surface with a predetermined nonplanar contour along a direction of elongation, having predetermined characteristics with respect to the fixed element;

(b) guiding the probe along said direction of elongation while continuously contacting said surface, coordinates measured by said measuring devices representing the movement of the probe;

(c) processing the measuring coordinates in the processor to yield measuring characteristics of the contour; and (d) comparing the measured characteristics of said contour with the predetermined characteristics to determine an indication of the accuracy of the measuring machine.

10. The method recited in claim 9, wherein said block includes a second surface which is substantially planar, and wherein said step (b) further includes guiding the probe while in simultaneous contact with said surface and said second surface.

11. An accuracy verification device for verifying the accuracy of a measuring machine including a fixed element, a movable element and measuring devices for measuring the position of the movable element relative to the fixed element, said device comprising;

a block adapted to be mounted in a fixed position relative to the fixed element of the matching, said block having a linear scale mounted along a direction of elongation said block having an upper surface with an upwardly facing V-shaped channel disposed therein for guiding a probe attached to the movable member along said direction of elongation;

a support member adapted to be attached to the movable element of the measuring machine and adapted for movement along said direction of elongation of said block with the movable element; and an encoder disposed on said support member at a position proximate said linear scale for reading the distance traveled along said linear scale when said support member moves with respect to said block, a movable block adapted to be disposed in said V-shaped channel, said movable block adapted to provide a contract force during a measurement procedure, wherein a difference between a reading of said encoder and a value derived from readings of the measuring devices being indicative of the accuracy of the machine.

12. The device according to claim 11, wherein rollers are disposed between said support member and said block for providing a rolling contact surface for said support member as it moves with respect to said block.

13. The device according to claim 11, further comprising:

a first roller disposed on said support member for rolling on a first surface of said block; and a second roller disposed on said support member for rolling on a second surface of said block, wherein said rollers guide and align said support member for precise movement along said elongate length of said block.

14. The device according to claim 11, wherein said support member comprises a bracket for attachment to the movable member.

15. The device according to claim 11, wherein said support member comprises a carriage that is movable along said block, wherein said carriage includes a probe receiving surface.

16. An accuracy verification device for verifying the accuracy of a measuring machine including a fixed element, a movable element and measuring devices for measuring the position of the movable element relative to the fixed element, said device comprising:

a block for mounting a fixed position relative to the fixed element of the measuring machine, said block having a guideway formed in a surface of the block, said guideway having at least two side surfaces; and a plurality of switches, disposed on said block along said guideway at known distances and adapted to signal the measuring machine when the movable element moves along said guideway, wherein the known distance between said plurality of switches is compared to a distance, derived from readings of the measuring devices, that the movable element has moved between said plurality of switches to determine the accuracy of the measurement machine.

17. The accuracy verification device recited in claim 16, wherein the movable element contacts said at least two side surfaces of said block.

18. The accuracy verification device recited in claim 16, wherein said guideway is V-shaped.

19. The accuracy verification device recited in claim 16, wherein said switches are opto-electric switches.

20. An accuracy verification device for use with a measuring machine for verifying the accuracy of the machine, the measuring machine including a fixed element, a movable element having an axis, and a probe coupled to the movable element, the accuracy verification device comprising:

means for reciprocating the movable element along the axis as the probe travels along a surface while the probe is in contact with the surface, and a read-head disposed on the machine for measuring the period of reciprocation of the movable element, wherein said measured period is compared to a period based on characteristics of said means for reciprocating to provide an indication of the accuracy of the machine.

21. The accuracy verification device as recited in claim 20, wherein said means for reciprocating the movable element includes a cam rotatably mounted on said probe for rotation about a cam axis, said cam having a known surface configuration, said cam being adapted to contact the surface and rotate about the cam axis as the probe moves along the surface thereby moving the movable element along the axis and providing a measured profile of the cam shape which is compared to the known surface configuration of the cam to yield an indication of the accuracy of the machine.

22. The accuracy verification device recited in claim 20 wherein said means for reciprocating the movable element includes an actuator having a predetermined period attached between the movable element and the probe, said actuator moving the movable element along the longitudinal axis in a direction perpendicular to the surface as the probe moves along the surface, whereby a measured profile of the period of oscillation is obtained by the machine based on the oscillations of the actuator, and a comparison of the measured profile and the predetermined period yields an indication of the accuracy of the machine.

23. An accuracy verification device for measuring the accuracy of a measuring machine in a desired one or more of a plurality of directions, the machine including a fixed element, a movable element and measuring devices for measuring the position of the movable element relative to the fixed element, said device comprising:

a block for mounting in a fixed position relative to said fixed element, said block having a direction of elongation and a plurality of channels disposed in one side of said block, each of said channels having at least two substantially flat side surfaces, said plurality of channels being disposed known distances apart, each of said plurality of channels adapted to allow the movable element to move along the channels while continuously contacting said side surfaces, wherein the accuracy of the machine in a desired direction is verified by comparing values derived from the measuring devices with the predetermined distances between the channels.

* * * * *